W. THOMSON.
Mariner's Compass.

Patented Sept. 28, 1880.

W. THOMSON.
Mariner's Compass.

No. 232,781. Patented Sept. 28, 1880.

Fig. 2.

Attest:
Chas J. Gooch.
Geo. T. Smallwood Jr.

Knight Bros.
Attys for Sir William Thomson, Kt.

W. THOMSON.
Mariner's Compass.

No. 232,781.             Patented Sept. 28, 1880.

Attest
Chas. J. Gooch
Geo. F. Smallwood Jr.

Knight Bros
attys for Sir William Thomson Kt

W. THOMSON.
Mariner's Compass.

No. 232,781. Patented Sept. 28, 1880.

UNITED STATES PATENT OFFICE.

WILLIAM THOMSON, OF GLASGOW COLLEGE, NORTH BRITAIN.

MARINER'S COMPASS.

SPECIFICATION forming part of Letters Patent No. 232,781, dated September 28, 1880.

Application filed March 11, 1880. (Model.) Patented in England February 20, 1879.

*To all whom it may concern:*

Be it known that I, WILLIAM THOMSON, of Glasgow College, doctor of laws, and professor of natural philosophy in the University and College of Glasgow, in the county of Lanark, North Britain, have invented Improvements in the Mariner's Compass and in Appliances for Ascertaining and Correcting its Errors, of which the following is a specification.
The objects of my said invention are as follows: First, to obtain greater steadiness of the compass-card and diminished wear of the bearings of the bowl and card in vessels in which there is great vibration due to the working of the engines, the screw, or other causes; and, secondly, greater steadiness of the compass in vessels of war during gun-fire; thirdly, an improved method of applying correctors for the semicircular error; fourthly, an improved adjunct or auxiliary instrument for the correction of the heeling error; fifthly, an improvement in the compass-card.

To produce such steadiness of the compass-card as has hitherto been obtained in steamers which have powerful engines, and where there is much vibration, it has been customary to suspend the bowl by means of india-rubber bands. A serious objection to this method is that the india-rubber is liable to become rotten by exposure to heat or oil.

According to my invention I obtain a greater degree of steadiness of the compass-card without the use of india-rubber, and this I effect by hanging the compass-bowl either directly or with the intervention of a gimbal-ring from an elastic metal ring, preferably of brass wire, and constructed as follows: A single wire is first bent, and its ends are united by soldering or brazing, so as to form a ring of the proper size. This serves as a core, on which a second brass wire is laid on spirally six turns, or thereabout, round the core. The ends of this second wire are also united by soldering or brazing, and thus an elastic ring is produced strong enough to support the compass-bowl. In the case of suspending the compass-bowl from the elastic ring with the intervention of a rigid gimbal-ring the said elastic ring has two balls fixed at the ends of a diameter, which balls rest in two sockets attached to the brass rim of the binnacle, or the sockets may be on the ring and the balls on the binnacle, if preferred. This arrangement mitigates the effect on the knife-edges bearing the gimbal-ring and bowl and on the point bearing the compass-card of vertical tremors of the platform on which the compass rests. The knife-edges of the gimbal-ring are supported on two grooved stirrups hung by chains from the elastic ring. This mitigates the effect of horizontal tremors of the platform.

The semicircular error is corrected by steel magnets according to the general principle first given by the Astronomer Royal.

The varying adjustment of the correction required for variation in the ship's subpermanent magnetism and magnetism induced by the vertical component of the earth's magnetic force I effect in the following manner: I use two sets of magnets, one set placed fore and aft for counteracting the fore-and-aft component of the ship's magnetism, and the other set thwartship for counteracting the thwartship component. The thwartship set of magnets consists of a number of magnetized steel rods, of which the true north poles are preferably colored blue and the true south poles red. A vertical row of holes bored horizontally athwartship in the binnacle or in any convenient solid support under the compass constitute receptacles for holding the magnets. A sufficient number of magnets are placed in these holes to counteract the thwartship component of the ship's magnetism.

The fore-and-aft magnets are similar to the thwartship-magnets and are placed in holes similarly bored fore and aft; but I use two vertical rows fore and aft, one on each side of the compass, or one row as nearly under the center of the compass-card as the tube for the heeling-corrector allows, in order that there may be no perceptible difference in their effect on the compass when the ship rolls or heels to one side or the other.

The holes both for the reception of the thwartship and fore-and-aft magnets are preferably bored at such distances from the needles of the compass-card that the increase or diminution of the correcting force on the compass-needles caused by raising or lowering a magnet from one hole to the next one may be the same at different levels.

The magnets are kept in position by a door or cover in the shape of a long bar shut across their ends and secured by lock and key.

My new binnacle, besides the fittings described above for the fore-and-aft and thwartship magnets, contains, as did the binnacles described in the specification of my previous patent of November 19, 1878, No. 210,069, a central tube for heeling-corrector and brackets for carrying quadrantal correctors.

The altered plan of fore-and-aft and thwartship correctors necessitates an altered plan for adjusting and securing in adjusted position the heeling-corrector. In my new binnacle this corrector consists of one, two, or three bar magnets in a brass case hung in the central tube by a chain, which passes first horizontally and then vertically downward in the groove in the side of the binnacle adjacent to the outer ends of the receptacles of one set of the fore-and-aft magnets. This chain is held by a link thereof being pressed between two pins or the prongs of a fork, where it is held without possibility of dislodgment by the locked bar or door covering the ends of the said receptacles.

For correcting the part of the fore-and-aft component of the ship's magnetism which is due to magnetism induced by the vertical component of the earth's magnetic force, I have a receptacle fitted to the binnacle, in which a bar of soft iron can be placed. This bar has the subsidiary advantage of partially or wholly correcting the residue of the heeling error.

For ascertaining the heeling error I use an auxiliary instrument for comparing the vertical component of the earth's magnetic force on shore with the vertical component on board ship. The said instrument is constructed as follows: Two magnetic needles of hardened-steel wire are joined together and supported on two iridium points in a line at right angles to the length of the needles, and passing as nearly as may be through the center of gravity of the needles and frame. One of these points rests on a flat support of sapphire or other suitable hard material and the other point rests in or on a cylindrically-shaped support of similar hard material. The said needles are accurately balanced, so as to be horizontal when resting on the said points before being magnetized, and they are then magnetized. The needles are brought to a level position again by a vertical magnet placed at equal distances from the four poles of the needles and capable of being moved up and down. The position of the vertical magnet, according as it is higher or lower, gives a greater or less vertical force on the needles, the amounts of this force being determined by experiment for different positions of the said vertical magnet.

The improvement in my compass-card is for the purpose of preventing the ends of the needles from catching the silk spokes when the card is thrown up by concussion while guns are being fired. I accomplish this by connecting the ends of the needles with a silk cord passing through holes drilled in their ends.

Figure 3:
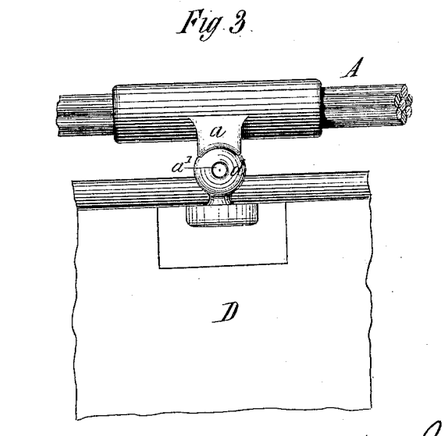
Figure 4:
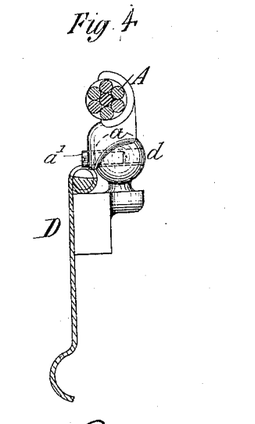

According to the arrangement illustrated in the said figures, I hang a gimbal-ring from an elastic metal ring, A, of an elliptical figure, to give different diameters, one for the supports of the ring upon the binnacle and the other for the supports of the gimbal-ring. The said ring A is preferably constructed as follows: A single brass wire is first bent, and its ends are united by soldering or brazing, so as to form a ring of the proper size. This serves as a core, on which a second brass wire is laid spirally, six turns or thereabout, round the core, as seen more clearly in Figs. 4 and 6. The ends of this second wire are also united by soldering or brazing, and thus an elastic ring is produced strong enough to support the compass-bowl and gimbal-ring. (Marked, respectively, B and C.) The ring A has two sockets, $a$, (see Figs. 3 and 4,) fixed at the ends of its longer diameter, which sockets rest on two balls, $d$, upon brackets attached to the rim D of the binnacle; or the balls $d$ may be on the ring and the sockets on the binnacle. Screws $a'$ secure the sockets to the balls, so as to allow them to have the requisite motion. This arrangement mitigates the effect on the knife-edges bearing the gimbal-ring and bowl and on the point bearing the compass-card of vertical tremors of the platform on which the compass rests.

Figure 5:
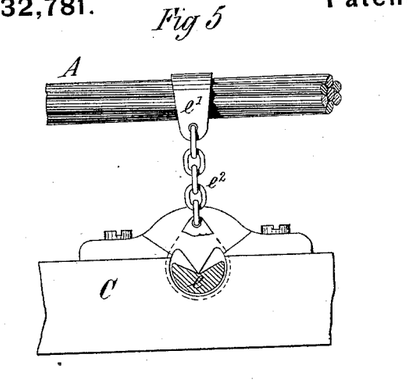
Figure 6:
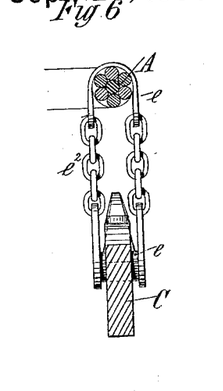

The knife-edges $c$ of the gimbal-ring C are supported on two grooved stirrups, $e$, hung by chains $e^2$ and saddle-pieces $e'$ on the elastic ring at the ends of its shorter diameter, as shown in the details, Figs. 5 and 6. The pieces carrying the knife-edges of the gimbal-ring are set sufficiently near the outer edge of the ring to prevent the chains $e^2$ from interfering with the movements of the compass-bowl.

The foregoing arrangement mitigates the effect of horizontal tremors of the platform.

In place of supporting the compass-bowl upon a rigid gimbal-ring, the said rigid ring may be dispensed with and the elastic ring A be employed for directly supporting the compass-bowl. In this case stirrups are suspended from saddle-pieces by means of chains, as described with reference to the parts $e$ $e'$ $e^2$, Figs. 5 and 6, these saddle-pieces being borne on hooks or half-rings fixed on brackets attached to the inside of the fixed upper rim of the binnacle, near its upper lip, and knife-edges fixed on the under side of the elastic ring A and at the respective ends of a diameter thereof rest in the said stirrups.

Figure 1:
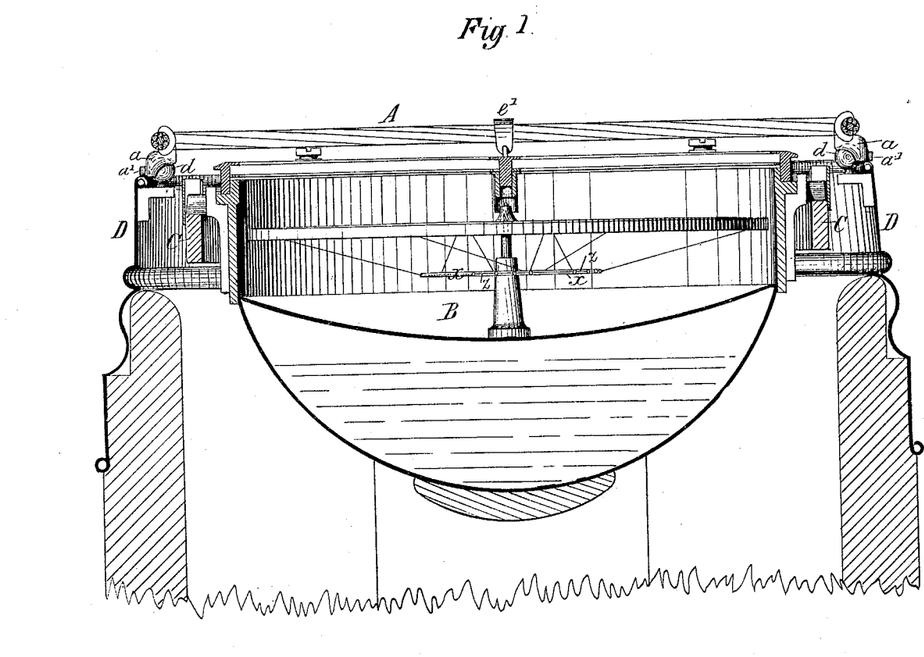
Figures 1, 2, 3, 4, 5, and 6 illustrate an arrangement according to my invention for giving steadiness of the compass-card without the use of india-rubber bands in steamers where there is great vibration, Fig. 1 representing a vertical section of the upper part of the binnacle and of the bowl and its adjuncts, Fig. 2 being a plan of the same, and Figs. 3, 4, 5, and 6 being details drawn to an enlarged scale for the better illustration of certain of the parts.
Figure 2:
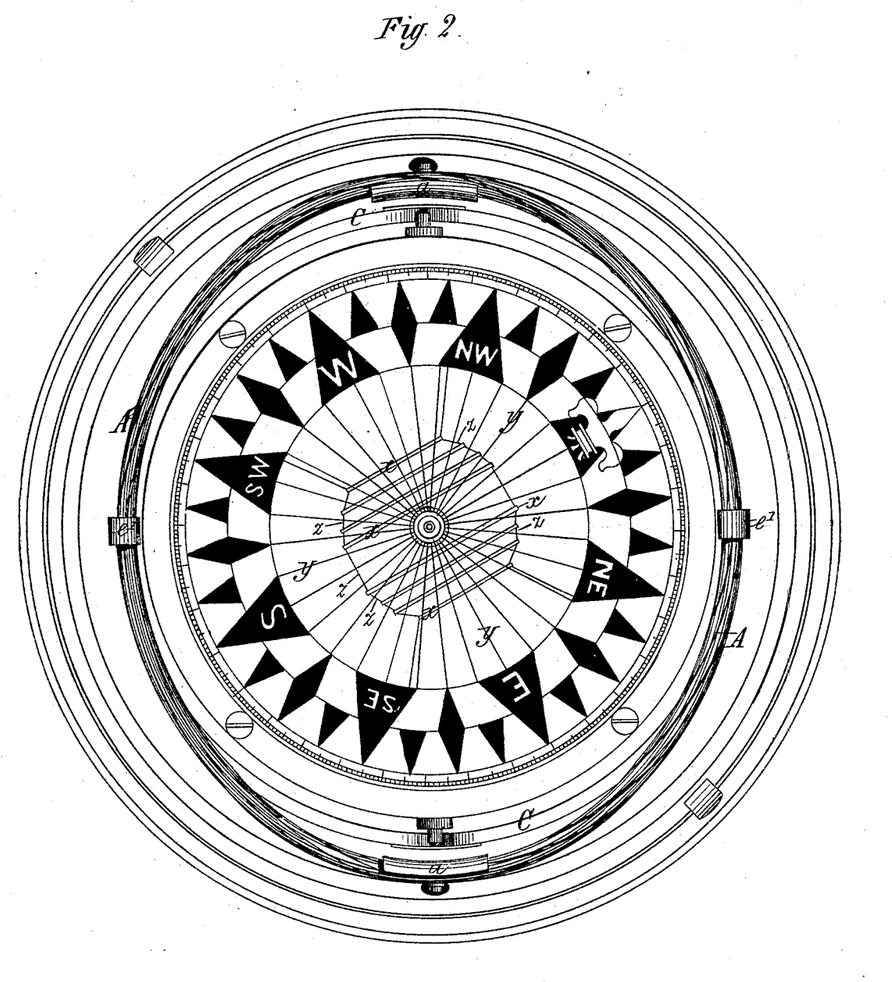

The compass-bowl is supported upon the elastic gimbal-ring in a manner similar to that in which the said bowl is supported upon the rigid gimbal-ring C in the arrangement shown in Figs. 1 and 2, the knife-edges of the bowl being supported upon V-grooves in plates attached to the upper side of the elastic ring A, at the ends of a diameter at right angles to that diameter at the ends of which the said ring is suspended from the rim of the binnacle.

The semicircular error in my improved compasses is corrected by steel magnets in accordance with the general principle first given by the Astronomer Royal.

Figures 7, 9A:
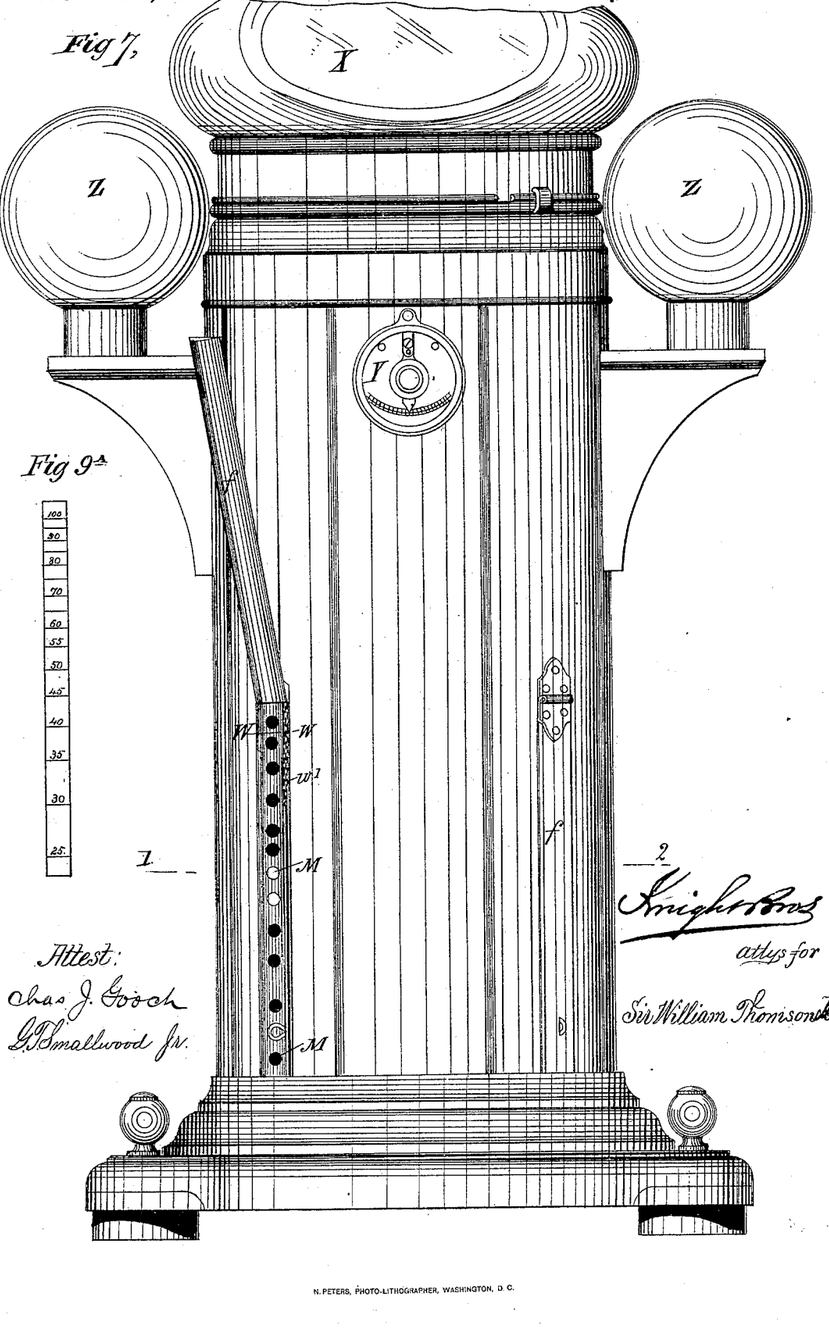
Figure 8:
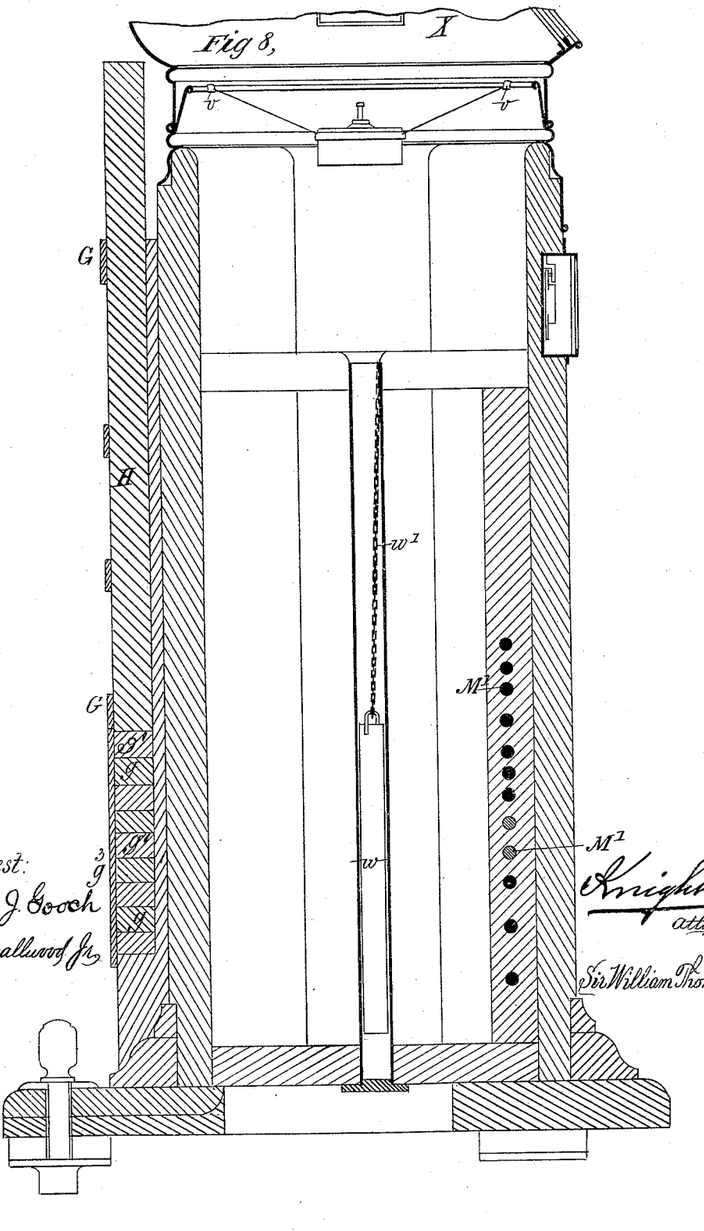
Figure 9:
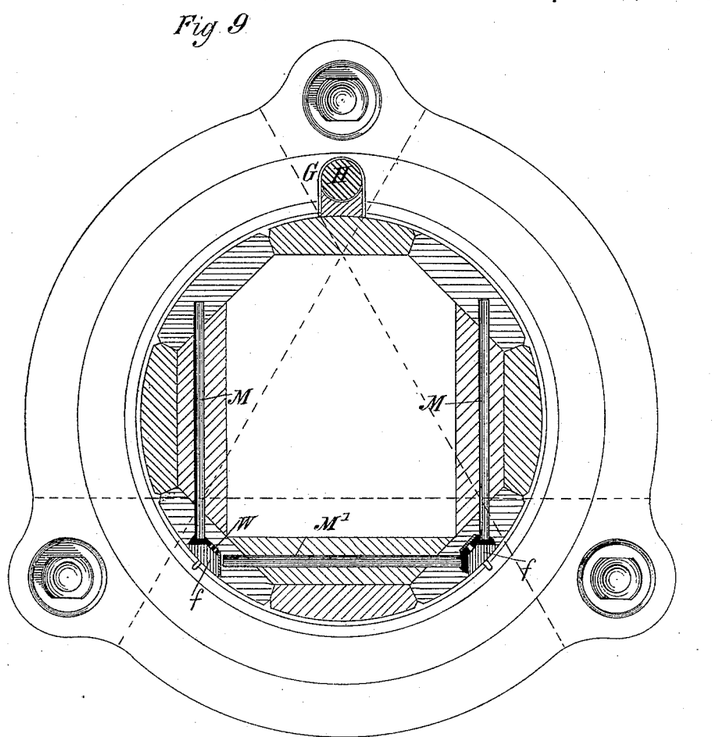

The varying adjustment of the correction required for variation in the ship's subpermanent magnetism and magnetism induced by the vertical component of the earth's magnetic force I effect in the manner now to be described, reference being had to Figs. 7, 8, and 9 of the accompanying drawings, of which Fig. 7 is a front elevation of the binnacle; Fig. 8, a vertical section through the center in a fore-and-aft line, and Fig. 9 a horizontal section on the line 1 2, Fig. 7. As in my former patents before mentioned, the binnacle is furnished with adjustable quadrantal correctors Z. In front is a clinometer, Y. The cover or cap is marked X.

For correcting the fore-and-aft component of the ship's magnetism I use magnets arranged in holes, as at M, Figs. 7 and 9, and I also use magnets arranged as at M' in Figs. 8 and 9 for correcting the thwartship component. The thwartship set of magnets consist of a number of magnetized steel rods, the true north poles being preferably colored blue and the true south poles being preferably colored red. A row of holes, one above the other, (see Fig. 8,) at equal or unequal distances apart, but preferably arranged as hereinafter described, are bored horizontally athwartship in the binnacle or in any convenient solid support under the compass, and these holes constitute receptacles for holding the magnets. A sufficient number of magnets are placed in these holes to counteract the thwartship component of the ship's magnetism. The fore-and-aft magnets are similar to the thwartship-magnets, and are placed in holes similarly bored; but I use two vertical rows fore and aft, one on each side of the compass, as seen at M in Figs. 7 and 9; or I may use one row as nearly under the center of the compass-card as the tube for the heeling-corrector allows, in order that there may be no perceptible difference in their effect on the compass when the ship rolls or heels to one side or the other. The holes, both for the thwartship and fore-and-aft magnets, are preferably bored at such distances from the needles of the compass-card that the increase or diminution of the correcting force on the compass-needles caused by raising or lowering a magnet from one hole to the next one may be the same at different levels. Each series of holes is marked with a scale such as that illustrated in Fig. 9$^A$, which scale corresponds to that described in the specification of the former Letters Patent hereinbefore referred to, the holes for the magnets M M' being at elevations corresponding to divisions of this scale. I use generally not less than two magnets in each row, and I reverse the lower magnet when with two in the two lowest holes their force on the compass over-compensates the error if they are turned so as to both pull in the same direction, and if the error is then under-compensated I raise the upper magnet until the compensation is obtained. The magnets are kept in their places by doors or covers $f$, secured by lock and key.

For correcting the part of the fore-and-aft component of a ship's magnetism which is due to magnetism induced by the vertical component of the earth's magnetic force I have a receptacle, G, (shown in Figs. 8 and 9,) fitted to the binnacle, in which receptacle a bar of soft iron, H, can be placed. As it can only be found by observation on board the ship in different magnetic latitudes to what height this bar must be raised and how large it must be, there may be provided on board bars of different length for placing in the receptacle G. For raising the bar to a greater or less elevation there are provided a number of pieces of wood, as at $g$ in Fig. 8, and by placing a greater or less number of these pieces beneath the bar H the said bar may be supported in a higher or lower position. Pieces of soft iron $g'$, corresponding to the pieces of wood, may also be provided, so that by substituting the said pieces of iron for one or more of the pieces of wood the effective length of the bar may be increased or diminished, as desired. By this arrangement of dividing the lower part of the bar into several pieces and the use of pieces of wood I avoid the necessity of providing several lengths for adjusting the degree of correction to what observation at sea shows to be required.

The receptacle G may have a door at its lower part, as at $g^3$, to retain the loose pieces, whether of wood or iron, in position.

The upper end of the bar H is preferably somewhat above the level of the needles, as shown in the drawings, so that the said bar may partially or wholly correct that part of the heeling error which depends on the variation in the ship's magnetism produced by differences in the vertical component of terrestial magnetic force in different localities.

Figure 10:
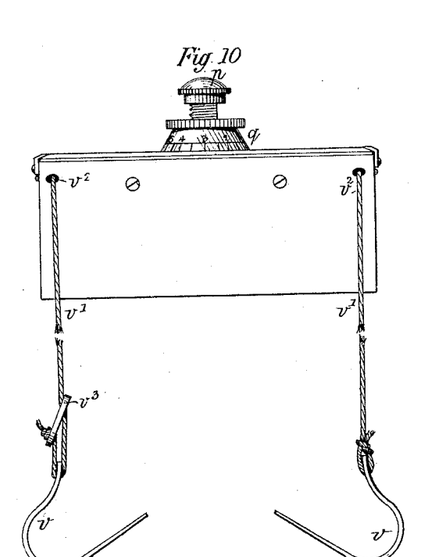
Figures 11, 13:
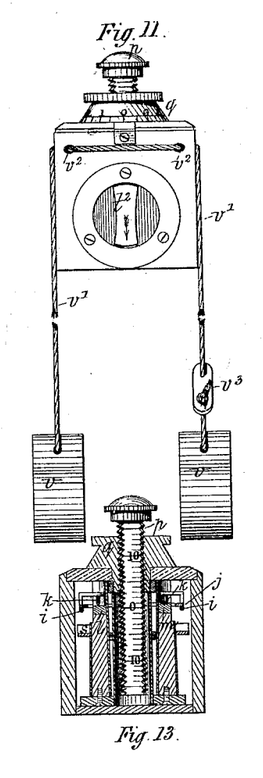
Figure 12:
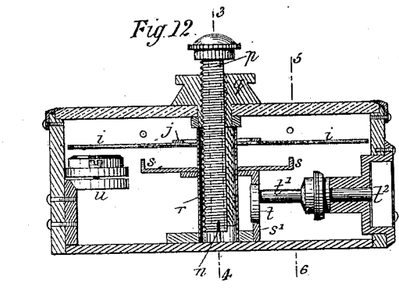
Figure 14:
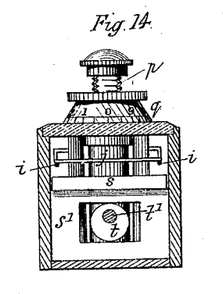
Figure 15:
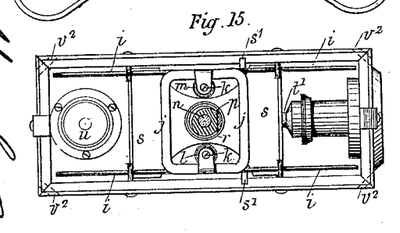

The instrument for comparing the vertical force on shore with the vertical force on board ship is shown in Figs. 10, 11, 12, 13, 14, and 15, Figs. 10 and 11 being respectively side and end elevations of the said instrument, and Fig. 12 being a side elevation, with the casing and certain other parts in section, and Figs. 13 and 14 transverse sections taken, respectively, on the lines 3 4 and 5 6, Fig. 12. Fig. 15 is a plan, partly in section, of the said instrument.

$i\ i$ are magnetic needles, formed of hardened-steel wires or bars, connected together by the frame-work $j$, and supported on the tops of two columns by two iridium points, $k$, in a line at right angles to the length of the wires, and passing as nearly as may be through or a little above the center of gravity of the two needles and their frame. One of these points rests on a plane surface, $l$, at the top of one of the columns, (see Fig. 13,) and the other on a cylindrical surface $m$ at the top of the other of the columns, the axis of the cylinder being parallel to the needles. Each of these surfaces is of a hard substance, such as sapphire or glass. Guards are attached to the tops of the columns, projecting above the hard bearing-surfaces $l\ m$, as seen in Fig. 13, by which the arms carried by the iridium points are prevented from too great motion in any horizontal direction, particularly directions parallel to the needles. The needles $i\ i$ and their frame are accurately balanced, so as to be horizontal when resting on the points $l$ and $m$ before being magnetized, and they are then magnetized.

Horizontal lines, preferably black on white ground, are ruled on the sides of the containing-case, to show horizontality of the needles.

A vertical magnet, $n$, is inserted in the hollow rod $p$, which is so situated that the said magnet $n$ is at equal distances from the four poles of the magnets $i\ i$. The said rod is screwed on its exterior and works in the nut $q$, which is so connected to the top of the box of the instrument that it has no vertical movement, and so that by turning the said nut $q$ the rod $p$ and magnet $n$ can be raised or lowered and the force on the needles $i\ i$ adjusted so as to counteract the vertical magnetic force at any particular place. One side of the rod $p$ is flattened or grooved, and its lower end runs in a guide, $r$, with a filling-piece therein corresponding to the flattened part or groove, so that the said rod $p$ cannot rotate.

A scale of divisions corresponding to the threads of the screw is engraved on the flat or groove, by which the elevation of the magnet $n$ carried thereby may be ascertained, and the indications of this scale are subdivided by dividing the rim of the nut $q$ into divisions to indicate portions of a rotation.

When the instrument is being carried about the magnets $i$ are supported on the platform $s$, which platform can be raised by means of the eccentric $t$, which is upon a stem, $t'$, projecting to outside the casing, where it has a handle, $t^2$, the said eccentric engaging in a slot in a depending piece, $s'$, upon which the platform $s$ is mounted, the said piece $s'$ sliding in slotted guides in the sides of the casing of the instrument, as seen in Fig. 15. The instrument is furnished with a spirit-level, $u$, and has a glass top to its casing.

When the instrument is used in the binnacle the compass-bowl is taken out and the said instrument is supported from the brass rim of the binnacle, as shown in Fig. 8, by means of four hooks, $v$, at the ends of two cords, $v'$, passing through the holes $v^2$ in the casing of the said instrument. One end of each cord $v'$ is fixed to a tent-rope bead, $v^3$, as shown in Figs. 10 and 11. By means of the tent-rope beads $v^3$ the lengths of the cords $v'$ may be altered to adjust the instrument at a level (which may be ascertained by the spirit-level $u$) and to the proper height.

Figure 7A:
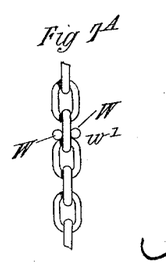

To correct the heeling error by this instrument, it is first taken on shore and the vertical magnet $n$ is raised or lowered until the magnets $i\ i$ are horizontal, when the reading of the scale on the rod $p$ is noted. The nut $q$ is then turned so as to diminish the effect of the magnet $n$ on the magnets $i\ i$ to the proper theoretical proportion, called "$\lambda$" in the Admiralty Compass Manual. The instrument is then taken on board the ship and placed in the binnacle in the manner before described, and the vertical magnet (marked $w$ in Fig. 8) in the binnacle is then raised or lowered by its chain $w'$ until the needles rest balanced in their horizontal sighted position. The chain of the said magnet $w$ is then secured, so as to retain the said magnet in the position to which it has been brought, by passing a link thereof between a fork or its equivalent situated at the position marked W in Figs. 7 and 9. The said fork is shown separately to a large scale in Fig. 7A, where it is marked W, a part of the chain $w'$ of the magnet being also shown. The doors $f$, when closed, will cover this fork W and the end of the chain $w'$ and secure the said chain.

In Figs. 1 and 2 I have shown my improvement in the compass-card for preventing the ends of the needles $x$ from catching in the silk cords constituting the spokes $y$ of the card if the said card is thrown up. The said improvement consists in connecting the ends of the said needles $x$ by a silk cord or cords passed through holes drilled in their ends, as will be readily seen by reference to the said Fig. 2, where the cord or cords are marked $z$. The said cords will prevent the ends of the needles from catching over the cords $y$.

A narrow silk ribbon is drawn tightly round the outside of the aluminium ring of the compass-cord to prevent the gummed tissue-paper to which the paper of the compass-card is attached from cracking off with use in hot climates or otherwise. The silk ribbon is fastened to the aluminium ring by sewing through perforations in the said ring at a sufficient number of places therearound.

I claim—

1. The elastic metal ring A herein described, consisting of a straight wire core and a spirally-wound exterior wire, for supporting the compass-bowl, as and for the purpose described.

2. The combination of elastic ring A, binnacle-ring D, sockets $a$, and balls $d$, as and for the purpose set forth.

3. The combination of elastic ring A, gimbal-ring C, grooved stirrups $e$, chains $e^2$, and saddle-pieces $e'$, as and for the purpose set forth.

4. The vertical series of horizontally-extending receptacles for the magnets, arranged below the compass-card and graduated in position and marked with a scale, as and for the purpose set forth.

5. The bars or doors $f$, fastened across the ends of the correcting-magnets to secure them in their adjusted positions until readjustment is to be performed.

6. The combination, with a binnacle, of the receptacle G, iron bar H, wooden blocks $g$, and iron blocks $g'$, as and for the purpose described.

7. The auxiliary instrument for ascertaining the heeling error in mariners' compasses, consisting of magnetic needles $i$, connected together by a frame-work, $j$, and supported by iridium points $k$ resting on hard bearing-surfaces $l$ $m$, vertical magnet $n$ carried by hollow rod $p$, nut $q$, platform $s$, eccentric $t$, spirit-level $u$, and glass-topped casing, the whole being constructed, arranged, and operated substantially as and for the purpose set forth.

8. The means for preventing the needles $x$ from catching into the silk cords $y$, constituting the spokes of the card of mariners' compasses, consisting of the cord or cords $z$, attached to the ends of the said needles, as hereinbefore described.

9. The fork-holdfast W for the chain of the heeling-corrector, secured by a bar or door, $f$, fastened over it.

10. An aluminium ring having a strip of silk secured to the exterior thereof, for preventing the paper to which the paper of the compass-card is attached from cracking off.

In testimony whereof I have signed my name to this specification in the presence of two subscribing witnesses.

WILLIAM THOMSON, KT.

Witnesses:
  FLEMING JENKIN,
    3 *Gr. Stuart St., Edinburgh.*
  W. BOTTOMLEY, Jun.,
    2 *Eton Terrace, Hillhead, Glasgow.*